United States Patent [19]

Culbertson et al.

[11] 4,430,491

[45] Feb. 7, 1984

[54] POLY(ETHER-AMIDE) POLYMERIC COMPOSITIONS

[75] Inventors: Billy M. Culbertson, Worthington; Timothy A. Tufts, Columbus, both of Ohio

[73] Assignee: Ashland Oil, Inc., Ashland, Ky.

[21] Appl. No.: 429,748

[22] Filed: Sep. 30, 1982

[51] Int. Cl.³ .................... C08G 65/40; C08G 69/44; C08G 69/40
[52] U.S. Cl. ................................. 528/153; 528/148; 528/149; 528/150; 528/154; 528/155; 528/158; 528/162; 528/163; 528/172; 528/208; 528/210; 528/212
[58] Field of Search ............... 528/212, 172, 210, 208, 528/148, 149, 150, 153, 154, 155, 158, 162, 163

[56] References Cited

U.S. PATENT DOCUMENTS

| | | | |
|---|---|---|---|
| 3,737,408 | 6/1973 | Hunsucker | 528/211 |
| 3,738,961 | 6/1973 | Tomalia et al. | 528/211 |
| 3,755,257 | 8/1973 | Hunsucker | 528/211 |
| 4,195,154 | 3/1980 | Kaiser et al. | 528/98 |

Primary Examiner—Lester L. Lee
Attorney, Agent, or Firm—William Kammerer

[57] ABSTRACT

Thermoplastic and thermoset polymeric compositions, having particular utility in the area of molding applications, are obtained by reacting a compound containing a plurality of oxazoline groups with a phenol or a phenolic resin each containing a plurality of aromatic hydroxyl groups.

7 Claims, No Drawings

POLY(ETHER-AMIDE) POLYMERIC COMPOSITIONS

BACKGROUND OF THE INVENTION

1. Field of the Invention

This invention relates to linear and crosslinked polymeric compositions composed of repeating segmental residues having alternating ether and amide linkages.

2. Description of the Prior Art

It is known that a 2-oxazoline will react with a compound containing an active hydrogen group of sufficient acid strength in a ring opening type mechanism to provide a secondary amide. Active hydrogen compounds reported in the prior art capable of undergoing the indicated reaction include carboxylic acids, thiols and phenols, the latter embracing the various phenol-aldehyde or phenol-ketone condensates containing a plurality of aromatic hydroxyl groups. The reaction of a novalak in this manner to prepare a polyamine precursor is exemplified in U.S. Pat. No. 4,195,154.

Beyond preparing amides in accordance with this chemistry, the prior art also teaches the preparation of polymeric compositions resulting when the respective reactants are polyfunctional in nature. Thus the preparation of poly(thioether-amide) type polymeric composition is reported, for example, in J. Polym. Sci., Lett. Edit., 18, 761 (1980). Dicarboxylic acids and a bisoxazoline likewise react in the step-growth polymerization reaction to provide a poly(ester-amide) type polymeric composition. The latter investigatory prior art can be found in J. Polym. Sci., Polym. Lett. Edit., 4 25 (1966).

The aforesaid poly(thioether-amide) as well as the poly(ester-amide) polymeric compositions have not gained commercial acceptance in spite of their potentially interesting structural characteristics. This is so for presumably a variety of reasons. For instance, the general unavailability of the polythiols and the odor problem associated with their use represent serious drawbacks in the commercial development of polymeric compositions of this type.

The diacids, on the other hand, are commodity items and more facilely undergo the underlying ring opening reaction. But the diacids, particularly the desirable aromatics, suffer because of their high melting points thereby making melt processing difficult if not infeasible.

SUMMARY OF THE INVENTION

In accordance with this invention a class of polymeric compositions is provided structurally characterized in having segmental residues containing alternating ether and amido linkages. The contemplated compositions are obtained via a step-growth polymerization process carried out in a neat reaction system whereby a compound having a plurality of 2-oxazoline groups reacts with a compound having a plurality of aromatic hydroxyl groups. The underlying reaction mechanism is one wherein the active hydrogen atom of an aromatic hydroxyl group effects ring opening of the 2-oxazoline group resulting in the rearrangement thereof to form a secondary amide linkage. The reaction progressively proceeds to provide the indicated alternating ether and amido linkages along the component polymeric chains. Thermoplastic compositions are obtained when each of the respective reactants are difunctional. Crosslinked or thermoset compositions, on the other hand, are provided when the functional groups of said respective reactants total at least five.

DESCRIPTION OF THE PREFERRED EMBODIMENTS

The oxazolines useful in the practice of this invention include a variety of such compounds having at least two 2-oxazoline groups. The applicable polyfunctional oxazolines are devoid of other functional groups capable of reacting in any manner with either an oxazoline group or an aromatic hydroxyl group. From the standpoint of potential commercial availability in commodity proportions the oxazolines derived from the polycarboxylic acids are preferred. Particularly exemplary of such polyacids are the aromatic acids; e.g., isophthalic acid, terephthalic acid and trimesic acid. The indicated polyfunctional oxazoline compounds can be conveniently prepared by the reaction of the corresponding esters of said polyacids and ethanolamines.

An enumeration of representative polyfunctional oxazoline compounds useful in the practice of this invention, particularly the bis-oxazolines, is as follows: 4,4',5,5'-tetrahydro-2,2'-bisoxazole; a 2,2'-(alkanediyl) bis [4,5-dihydrooxazole], e.g., 2,2'-(1,4-butanediyl) bis [4,5-dihydrooxazole]; a 2,2'-(arylene) bis [4,5-dihydrooxazole], e.g., 2,2'-(1,4-phenylene) bis [4,5-dihydrooxazole], 2,2'-(1,5-naphthalenyl) bis [4,5-dihydrooxazole] and 2,2'-(1,8-anthracenyl) bis [4,5-dihydrooxazole]; a sulfonyl, oxy, thio or alkylene bis 2-(arylene) [4,5-dihydrooxazole], e.g., sulfonyl bis 2-(1,4-phenylene) [4,5-dihydrooxazole], oxy bis 2-(1,4-phenylene), [4,5-dihydrooxazole], thio bis 2-(1,4-phenylene) [4,5-dihydrooxazole] and methylene bis 2-(1,4-phenylene) [4,5-dihydrooxazole]; a 2,2',2''-(arylene) tris [4,5-dihydrooxazole], e.g., 2,2',2''-(1,3,5-phenylene) tris [4,5-dihydrooxazole]; a poly [2-(alkenyl)4,5-hydrooxazole].e.g., poly[2-(2-propenyl) 4,5-dihydrooxazole].

A like enumeration of representative compounds having at least two aromatic hydroxy groups useful in the practice of this invention, particularly the bisphenols, is as follows: the various benzene and fused aromatic ring diols and triols, e.g., 1,4-benzene diol (hydroquinone), 1,3-benzenediol (resorcinol), 1,4naphthalene diol and 1,3,5 benzene triol; the biphenyl diols, e.g., [1,1'-biphenyl]-2,2'-diol; the alkylene and cycloalkylene bisphenols, e.g., 2,2'methylene bisphenol, 4,4'-(1-methylethylidene) bisphenol (Bisphenol A), 4,4'-(phenylmethylene) bisphenol, 4,4'-(cyclohexanediyl) bisphenol, 4,4'-(1,2-diethyl-1,2-ethenediyl) bisphenol, and 3,4-bis(4-hydroxyphenyl)-2,4-hexadiene; the arylene bisphenols, e.g., 4,4'-phenylene bisphenol; the oxy, thio and sulfonylbisphenols, e.g., 2,3'-oxybisphenol 4,4'-thiobisphenol and 2,2'-sulfonyl bisphenol; the bis (hydroxyaryl) alkanones, e.g., bis (4-hydroxyphenyl) methanone, 1,5-dihydroxy-9,10-anthracenedione and 4-[bis(4-hydroxyphenyl)methylene]-2,5-cyclohexadiene-1-one; the various benzamide and benzoate derivatives, e.g., 2-hydroxy-N-(4-hydroxyphenyl) benzamide, 4-hydroxy-4-hydroxyphenyl benzoate, 2-methyl-2-[[(4-hydroxybenzoyl) oxy]methyl]-1,3-propanediyl-4-hydroxybenzoate, bis (4-hydroxy benzoate)-1,2-ethandiyl; 2-(4-hydroxy benzoate) ethyl ether, bis (4-hydroxy benzamide)-1,6-hexanediyl and bis (4-hydroxy benzamide)-1,4-benzenediyl.

The above enumerations of oxazoline and phenolic compounds are, as specifically indicated, illustrative of the respective types of compounds useful in the practice of the invention. Besides the various isomers of these representative compounds, a broad variety of substituted compounds are likewise applicable. In respect of the latter compounds the sole requirement being that the substituent group is not reactive with either an oxazoline or an aromatic hydroxyl group. Examples of such substituent groups include: alkyl, aryl, halo, cyano, nitro, alkoxy, aryloxy, alkyl and aryl sulfides, amine and alkyl or aryl substituted amine, amide, ester, etc.

In addition to the phenolic compounds noted above a variety of oligomers containing a plurality of phenolic residues constitute an important class of materials for reacting with the contemplated oxazolines in accordance with this invention. Particularly representative of such oligomers are the base or acid catalyzed phenol formaldehyde condensation products preferably the latter condensates; viz., the novalaks. Besides the conventional resoles, the phenolic resins characterized in having benzylic ether linkages prepared by metal ion catalysis such as disclosed in U.S. Pat. No. 3,485,797 are applicable. Other suitable polyphenol oligomers include the addition polymers and copolymers of a vinyl substituted phenol; e.g., 4-ethenylphenol.

As indicated previously the step growth polymerization reaction between the oxazoline compound and the phenolic compound or oligomer is carried out in a neat system which is otherwise referred to as being conducted in the melt phase. Melt phase processing accordingly constitutes the mode of choice in preparing matrix resins for the production of composites which represents a prime utility of the present invention. In some instances, however, it may be desirable to conduct the initial polymerization reaction in solution employing a high boiling aprotic solvent such as, for example, N,N-dimethylacetamide, N,N-dimethylformamide, 1-methyl-2-pyrrolidinone, methylsulfoxide, etc. The polymerization product can then be isolated and curing completed in a subsequent molding operation.

The reaction temperature for both of the indicated methods of preparation broadly ranges from about 140° C. to 270° C. In preparing thermoplastic compositions the preferred stoichiometry is on an equimolar basis. Suitable stoichiometry in preparing thermoset products ranges from 0.5-1.0 equivalent of the oxazoline compound per equivalent of the phenolic reactant. The use of a catalyst is optional. Applicable catalysts include the soluble transition metal salts of which zinc acetate is preferred. A comprehensive listing of suitable catalysts for this purpose can be found in the abovementioned U.S. Pat. No. 4,195,154.

The following working examples collectively serve to illustrate the best mode contemplated for carrying out the present invention.

EXAMPLE I

Bisphenol A (BPA, polycarbonate grade) and the bisoxazoline of terephthalic acid (BOTA) were dried in vacuo at 50° C. for 5 hours. 4.56 g of BPA and 4.32 g of BOTA were mixed as powders and placed in a reaction flask. The flask was flushed with dry $N_2$ for 20 minutes and then heated to 180° C. in a sand bath under a positive pressure of $N_2$. After 4 hours at 180° C., the temperature was raised to 230° C. over a period of 2 hours and held there for 15 hours.

An amber, transparent, brittle solid resulted. The IR spectrum showed bands typical of amide and ether bonds. The solid was soluble in N,N-dimethylformamide (DMF), 1-methyl-2-pyrrolidinone (NMP), and m-cresol. The polymer melt temperature (PMT) was 150°-160° C., the inherent viscosity ($N_i$) was 0.28 (0.5 g/dl in NMP at 35° C.) and the gel permeation chromatography (GPC) molecular weight was 113,700 g/mole (weight average) and 11,400 g/mole (number average). These were run in DMF on silica gel columns. The decomposition temperature (10% weight loss) as measured by thermogravimetric analysis (TGA) in $N_2$ was 340° C.

EXAMPLE II

An identical polymerization as in Example I, except that a temperature of 230° C. was maintained for 35 hours, gave a similar product. The PMT was 150°-160° C. and the GPC molecular weight was 34,900 g/mole.

EXAMPLE III

Bisphenol A (4.56 g) and the bisoxazoline of isophthalic acid (BOIA) were polymerized as outlined in Example I. The resultant polymer was soluble in DMF, NMP and m-cresol. The PMT was 140°-150° C. and the decomposition temperature (10% weight loss by TGA in $N_2$) was 360° C.

EXAMPLE IV

The polymerization procedure outlined in Example I was followed in reacting 2.20 g resorcinol and 4.32 g of BOTA. After 8 hours of reaction, the mixture solidified to an opaque orange mass. The product was hard and somewhat tough and soluble only in phenol and m-cresol. The PMT was 240°-260° C. Ten percent weight loss by TGA in $N_2$ occurred at 370° C. Moderately flexible transparent orange films of the polymeric product could be melt pressed at 500° F.

EXAMPLE V

In a similar manner as in Example I, 4.36g of bis(4-hydroxyphenyl sulfide) and 4.32 g BOTA were polymerized. A light green solid resulted after 6 hours which did not remelt during the reaction. The resultant product was an opaque, hard solid soluble in m-cresol and phenol. The PMT was 240°-260° C., while TGA showed 10% weight loss at 270° C. The inherent viscosity of the polymer was 0.45 dl/g (0.5 g/dl in m-cresol at 35° C.). A clear, brittle film could be pressed at 500° F.

EXAMPLE VI

To a 250 ml round bottom flask equipped with a magnetic stirbar was added 3.24 g BOTA, 3.75 g bis(4-hydroxyphenyl) sulfone, and 100 ml. of dry NMP. After flushing the reaction mixture for 15 minutes with dry $N_2$, a positive pressure of $N_2$ was maintained while heating at 185° C. with stirring for 24 hours. The polymer was isolated by pouring the homogeneous solution into 1 liter of rapidly stirred ether. The gray powder was then dried in vacuo.

EXAMPLE VII

Bisphenol A and BOTA were charged as in Example I and 0.8 g $Zn(C_2H_3O_2)_2.H_2O$ were added as catalyst. The polymerization was carried out for 21 hours using identical reactant proportions and conditions as in said example. A similar product was obtained, with $N_i=0.28$ dl/g (0.5 g/dl in NMP at 35° C.). GPC results obtained as in Example I gave $M_w=160,400$ g/mole and $M_n=8,300$ g/mole.

EXAMPLE VIII

Following the procedure of Example I, 3.24 g. of BOIA and 3.75 g bis(4-hydroxyphenyl) sulfone were polymerized in the melt. A golden-brown transparent solid resulted which softened above 200° C.

EXAMPLE IX

Sulfonyl bis 2-(1,4-phenylene) [4,5-dihydrooxazole] (3.44 g) and 2.28 g bisphenol A were mixed and heated as set forth in Example I. A brown, hard thermoplastic product resulted with a PMT of 150°–165° C.

EXAMPLE X

BOTA (2.16 g) and bis(4-hydroxybenzamide)-1,6-hexanediyl (3.44 g) were mixed dry and heated at 210° C. for 24 hours. A clear, brown resin resulted which had a PMT of 135°/4 150° C. IR showed amide and ether bands.

EXAMPLE XI

Bis-(4-hydroxyphenyl sulfide) (4.3 g) and 3.92 g of 2,2'-(1,4-butanediyl)bis[4,5-dihydrooxazole) were mixed and polymerized as in Example I. A dark brown brittle solid resulted which was soluble in DMF.

EXAMPLE XII

A clear, yellow-brown resin was prepared by mixing in the melt 1.2 g BOIA and 1.8 g of phenol-free novolac (American Hoechst' Alnovol PN 320I) at 200° C. After 30 minutes, the mixture was no longer fluid, and after 4 hours an infusible, insoluble resin resulted with a Barcol hardness 50–55. The Tg by DSC was 150° C. and 10% weight loss in $N_2$ by TGA occurred at 380° C.

EXAMPLE XIII

A laminate was produced using the composition of Example XII. A prepreg solution was prepared by mixing 350 g acetone, 390 g Alnovol PN 320I, and 260 g BOIA until a homogeneous solution was obtained. An eleven inch wide strip of Stevens 7781 glass cloth (silane finish #9725) was impregnated with the solution and dried for 17 minutes in a circulating air oven at 177° C. The dry prepreg was cut into 10"×10" squares, 14 plies were stacked and placed in a heated mold. A pressure of 70 psi was applied and the laminate cured for 2 hours at 177° C. After removal from the oven, the panel (containing 66% glass by weight) was post-cured at 230° C. for 16 hours. Samples were cut and tested in the machine direction of the glass fabric. Mechanical properties are given below.

| Tensile Strength (psi) | 65,500 |
| Tensile Modulus (psi) | 4.1 × $10^6$ |
| Flex Strength (psi) | 108,000 |
| Flex Modulus (psi) | 4.5 × $10^6$ |
| ILSS (short beam shear) (psi) | 11,100 |

A sample prepared in a similar manner using Hexcel 1581 style cloth (F16 finish) and containing about 75% glass cloth by weight was aged in air at 205° C. for 1000 hours. The effect of the aging cycle is noted as follows:

| Sample | Flex Strength (psi) | Flex Modulus (psi) |
|---|---|---|
| control | 85,700 | 4.1 × $10^6$ |
| aged 1000 hours | 82,900 | 4.4 × $10^6$ |

EXAMPLE XIV

In this example, Resin M, a product of Maruzen Oil, Ltd. was employed. Resin M is poly (vinyl phenol) having a reported molecular weight of 30,000 g/mole.

BOIA (1.9 g) and Resin M (2.1 g) were mixed in the melt at 200° C. The sample gelled after 20 minutes and was cured for an additional 3 hours. Post curing at 230° C. was done for 16 hours. 10% weight loss by TGA occurred at 200° C., and no distinct transition (Tg) was found by DSC below 300° C.

A laminate (4 plies) was prepared from an acetone prepreg solution and glass cloth as in Example XIII. A tough, stiff laminate was produced at 177° C. and 50 psi.

EXAMPLE XV

A mixture was prepared using 1.0 g Resin M (8–10,000 g/mole), 0.8 g BOIA, and 0.1 g of 2,2',2"-(1,3,5-phenylene)tris[4,5-dihydroxazole. After curing as in Example XIV, TGA gave 385° C. as 10% weight loss and a possible Tg by DSC at 265° C.

EXAMPLE XVI

In this example, the effects of various catalysts on gel times of the BOIA/Alnovol 320 system is shown. BOIA (1.2 g) and Alnovol 320 PN (1.8g) were used in each case. Heating was done at about 200° C. and gel time was defined as the time from when a homogeneous solution was obtained until the loss of fluidity.

| Catalyst | Gel Time |
|---|---|
| none | 18 min. |
| zinc acetate* | 12 min. |
| zinc stearate | 12 min. |
| tin octoate | 10 min. |

*Catalyst not completely soluble.

EXAMPLE XVII

The phenolic resin of this example was a 2:1 copolymer of N-phenylmaleimide and 2-allylphenol. BOIA (2 g) and the copolymer (1 g) were melt mixed and cured as : before. A transparent, deep red resin resulted which was infusible and insoluble. The resin showed a Tg of 210° C. by DSC and its decomposition temperature (10% wt. loss by TGA) was 355° C.

What is claimed is:

1. A thermosetting polymeric composition prepared by effecting the step-growth polymerization reaction in the melt phase of a first reactant consisting of an oligomer containing a plurality of aromatic hydroxyl groups and a second reactant consisting of a compound having at least two 2-oxazoline groups.

2. The polymeric composition according to claim 1 wherein said first reactant is a phenol/aldehyde oligomeric condensate.

3. The polymeric composition according to claim 2 wherein said oligomeric condensate is a novalak.

4. The polymeric composition according to claim 3 wherein said second reactant is a bisoxazoline.

5. The polymeric composition according to claim 4 wherein said bisoxazoline is a arylene bisoxazoline.

6. The polymeric composition according to claim 5 wherein said arylene bisoxazoline is a phenylene bisoxazoline.

7. The polymeric composition according to claim 4 wherein said bisoxazoline is an alkylene bisoxazoline or an alkylidene bisoxazoline.

* * * * *